Sept. 24, 1968 H. DONHAUSER 3,402,856
LIQUID DISPENSING APPARATUS
Filed Jan. 25, 1967

INVENTOR
Hubert Donhauser
By: Attorney

# United States Patent Office 3,402,856
Patented Sept. 24, 1968

3,402,856
LIQUID DISPENSING APPARATUS
Hubert Donhauser, 175 Egglhamer Str., 8359 Aidenbach, Lower Bavaria, Germany
Filed Jan. 25, 1967, Ser. No. 611,765
Claims priority, application Germany, Feb. 1, 1966, D 49,274
11 Claims. (Cl. 222—164)

ABSTRACT OF THE DISCLOSURE

The disclosure deals with a sealed liquid container having a delivery tube extending through the container top and having thereabove an enlarged end in form of a liquid dispensing receptacle open at its top. The container, which also has an inlet for compressed gas to displace liquid through the tube into the receptacle, is tiltable into dispensing and inoperative positions, and normally spring-held in its inoperative position, and provisions are made for supplying the container through its inlet with compressed gas on tilting the same to its dispensing position.

---

This invention relates to medicament dispensing apparatus in general, and to liquid medicament dispensing apparatus in particular.

In known medicament dispensing apparatus of this kind, a medicament container is equipped with a diaphragm serving as a pumping element. An arm of an upright dispensing tube in the container is above the latter arranged horizontally to serve as a pump arm and is at its end formed as a trough in which to receive the pumped liquid. Since liquid is always left behind in the long tube, and more particularly in the horizontal arm thereof where it can resinify or crystallize, blockages may very easily occur. Because of the length and offset form of the dispensing tube, cleaning is also rather difficult and complicated. The individual parts of this prior apparatus, such as the tube and a container lid with the very sensitive diaphragm, are costly because of their complicated design and are also difficult to exchange. Further, accurate metering of the medicament is also not possible.

The object of the present invention is to provide a medicament dispenser which is of simple construction, is easy to operate and clean, of which all the parts can be exchanged easily and at low cost, and which affords highly accurate metering of the medicament. According to the invention, this is achieved by connecting the space in the container above the surface of the liquid with a source of pressure gas, and the inlet for the pressure gas to the container is provided with a closable vent. By simply closing the vent in the pressure-gas line, the medicament is made available in an amount corresponding to the time of closure of the vent, so that in this manner very accurate metering becomes possible. Moreover, the dispensing tube, which is inserted in an opening in the top lid on the container and is straight, is at its upper end provided with a dispensing funnel. The amount of medicament delivered at any given time is clearly visible in the funnel which is open at the top, and the amount of medicament therein may also be kept in very small quantities. The straight dispensing tube can be easily and quickly cleaned and also exchanged in the lid.

Further objects and advantages will appear to those skilled in the art from the following, considered in conjunction with the accompanying drawings.

In the accompanying drawings, in which certain modes of carrying out the present invention are shown for illustrative purposes:

Figure 1:
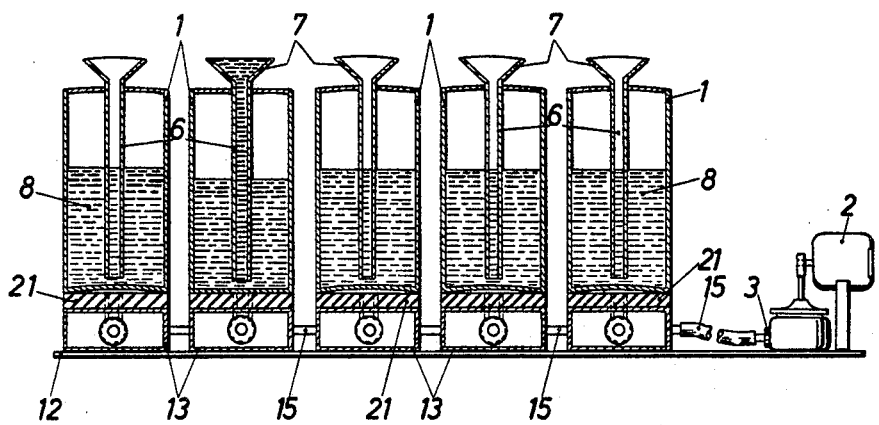
FIG. 1 is a section through apparatus according to the invention with five exemplary separately workable containers.

In FIG. 1, five cylindrical, separately workable, containers of metal or plastic are provided and are supplied with compressed air or pressure gas by a compressor 3 driven in this instance by an electric motor 2.

Figure 2:
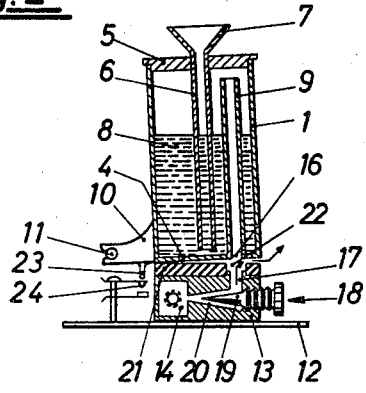
FIG. 2 is a section through a single container when not in use.

In FIG. 2, a container 1 is provided with a bottom 4 and a top lid 5 which can be removed for filling purposes. Extending through the lid downwardly into close proximity of the bottom 4 of the container is a straight vertical tube 6 which is provided at its upper end with a funnel 7 which is open at the top and adapted for reception and withdrawal of a metered amount of the liquid medicament 8 in the container 1. An inlet tube 9 for the pressure gas is provided on one side of the dispensing tube 6, the inlet tube extending from the bottom of the container to the upper part thereof near the lid 5. Fixed to the container 1 on the side remote from the inlet tube 9 is an arm 10 by means of which the container is tiltably mounted on a pivot 11.

Mounted on a bottom plate 12 below the container 1 is a base 13 with a pressure-gas chamber 14. The pressure-gas chambers 14 of the various containers 1 in FIG. 1 are arranged side by side and are connected to one another and to the compressor 3 by means of conduits 15. All the pressure-gas chambers 14 are therefore connected to the pressure-gas supply conduit 15.

Below the lower end 16 of the inlet tube 9 there is provided in the base 13 an outlet orifice 17 for the pressure gas, and this outlet orifice is in communication with the pressure-gas chamber 14 through intermediation of a valve 18 for shutting off the outlet orifice or regulating the flow passage therethrough. By adjusting a needle valve 19 relative to a conical seat 20 in the base, the flow passage can be so adjusted that the time for filling the funnels 7 at the different viscosities of the medicaments is approximately the same.

An elastic sealing disc 21, for example of rubber, which is substantially of the same size as the bottom 4 of the container 1, is provided on the base 13, and the same has an opening 22 for clearing the pressure-gas passage from the outlet orifice 17 to the inlet tube 9. This rubber disc 21 is a little thicker than the spacing between the base 13 and the container bottom 4, so that the container 1 will, when resting with its edge nearest the arm 10 on this disc, be held in a tilted position (FIG. 2) in consequence of which the connection between the opening 22 in the rubber disc 21 and the inlet tube 9 is interrupted and the pressure-gas may then escape in the direction indicated by the arrows (FIG. 2).

The arm 10 is equipped with a projection 23 in the operating arc of which there is placed an electric switch 24 for turning the motor 2 of the pressure-gas producer 3 on and off.

In order to withdraw medicament, downward pressure is applied on the container 1 with the finger, whereby the rubber disc 21 is compressed into sealing engagement with the plane container bottom 4 and the connection between the outlet orifice 17 and the inlet tube 9 is thereby restored. At the same time, the switch 24 is closed by the projection 23 and the pressure-gas producer is thereby started. Pressure gas then flows by way of the pressure-gas chamber 14, the outlet orifice 17 and valve 18 and the inlet tube 9 into the upper part of the container 1 and presses on the level of the liquid 8. As a result, the liquid ascends in the dispenser tube 6 and fills the funnel 7 to any desired extent. The liquid can be removed from the funnel immediately. On terminating the downward pressure on the container 1 the same is automatically swung into the tilted position shown in FIG. 2 owing to the elasticity of the sealing disc 21, so that the pressure-gas line to the container is interrupted and the liquid in the uptake tube drops back into the container without leaving resinifying or crystallizing residues behind.

Figure 4:
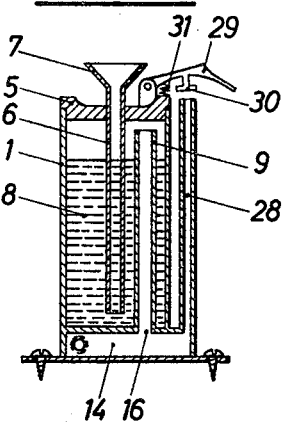
FIG. 4 is a longitudinal section through a modified form of a container.

In the dispenser form according to FIG. 4, the container 1 is formed integrally with the pressure-gas chamber 14 at the bottom. The pressure-gas chamber 14 extends to one side beyond the periphery of the container and has an upward extension in the form of another pressure-gas tube 28. Pivotally mounted on the top lid of the container 1 is a handle 29 with a closing element 30 for the pressure-gas tube 28. The handle 29 is held in this instance in the raised position by a spring 31, and every time it is pressed down to close the pressure-gas tube 28 the escape route therethrough for the pressure gas is blocked and the pressure gas flows through the tube 9 into the container 1 and raises the liquid into the funnel 7.

Figure 3:
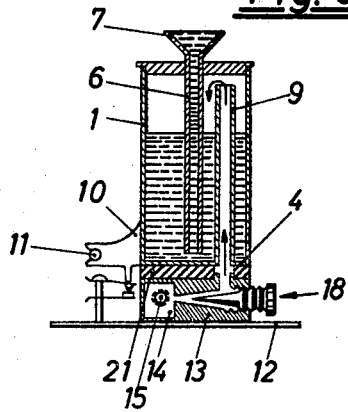
FIG. 3 is a similar section through the same container when in use.

When in the dispenser form according to FIGURES 1 to 3 a container is pressed downwardly for withdrawal of liquid medicament, the pressure gas escapes through the gap between the outlet orifice 17 and the inlet tube 9 in all the other containers, while it raises the liquid medicament into the withdrawal funnel 7 only in the container that is pressed downwardly.

The situation is similar in the dispenser form according to FIG. 4. The liquid medicament can enter the withdrawal funnel 7 only in that container of which the handle 29 is depressed, while in the case of all the other containers the pressure gas escapes through the respective pressure-gas tubes 28.

The apparatus according to the invention can be used wherever the withdrawal of small amounts of liquid is involved, especially in the case of a plurality of liquids. It is therefore not limited to the withdrawal of liquid medicaments.

In the apparatus according to the invention, as many containers and liquid medicaments may be provided as are used more frequently in the course of treatment. By light downward pressure on the appropriate container or shut-off device for the pressure gas, the withdrawal funnel fills more or less rapidly with the desired amount of medicament and this can be removed immediately with a cotton wad or plug. By removing the pressure, any further delivery of the medicament is instantaneously interrupted. Everything can even be done with one hand, so that the other hand is available for other purposes. Since the liquid is visible in the funnel, the delivered amount can be regulated exactly as required.

Each container 1 is preferably mounted detachably on its support, so that it can be easily filled, cleaned and exchanged.

Cartridges filled with the medicament at the factory may be employed as the containers 1, in which case the dispensing tubes 6 and the inlet tubes 9 may be pushed into them.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. Liquid dispensing apparatus, having a sealed liquid container with a top and bottom and an inlet for compressed gas into said container near said top thereof; a tube in said container extending through and above said top thereof, with said tube having open ends of which one end is in said container near the bottom thereof and the other end is above said container top and formed as an enlarged dispensing receptacle open at its top; a gas chamber with an outlet below said container bottom; and a conduit extending in said container upwardly from said bottom thereof and having upper and lower ends of which said upper end is near said container top and constitutes a gas inlet and said lower end is at said container bottom open to the outside of said container, with said container being at its bottom pivotally mounted for tilting movement into first and second positions in which said lower conduit end is continuous with and removed from said chamber outlet, respectively, to provide for and interrupt communication between them.

2. Liquid dispensing apparatus as in claim 1, in which spring means yieldingly hold said container in said second position.

3. Liquid dispensing apparatus as in claim 1, in which there is provided an elastic member on which said container rests with its bottom, with said member having an aperture open to said chamber and forming said outlet thereof.

4. Liquid dispensing apparatus as in claim 1, in which there is provided an elastic member on which said container rests with its bottom, with said member having an aperture open to said chamber, and forming said outlet thereof, and said member in its relaxed condition normally holding said container in said second position and being compressed on movement of said container into said first position.

5. Liquid dispensing apparatus as in claim 4, in which said container is in said first position in substantially vertical disposition, and is in said second position inclined to said vertical disposition.

6. Liquid dispensing apparatus as in claim 1, which further provides a gas compressor with a delivery side in communication with said chamber, means including an electric switch operative on closing and opening of the latter to render said compressor operative and inoperative, respectively and an actuator on said container opening and closing said switch on movement of said container into said second and first positions, respectively.

7. Liquid dispensing apparatus, having a plurality of sealed liquid containers with tops and bottoms, of which each container has an inlet for compressed gas near said top thereof and a tube extending through said top and having open ends of which one end is in said container near the bottom thereof and the other end is above said container top and formed as an enlarged dispensing receptacle open at its top; means pivotally mounting said containers for individual tilting of any container into first and second positions in each of which said top thereof is uppermost; spring means for each container normally holding the same in said first position; a gas conduit common to all containers and having outlets associated with the respective containers; and means operative on tilting any one of said containers into said first and second positions to vent the associated outlet of said gas conduit and provide communication between said associated outlet and said gas inlet in said one container, respectively.

8. Liquid dispensing apparatus as in claim 7, which further provides a gas compressor with a discharge side in communication with said gas conduit, means including an electric switch associated with each of said containers operative on closing and opening of any of said switches to render said compressor operative and inoperative, respectively, and an actuator on each container opening and closing the associated switch on tilting the respective container into said first and second positions.

9. Liquid dispensing apparatus, having a plurality of sealed liquid containers with tops and bottoms, of which each container has an inlet for compressed gas near said top thereof and a tube extending through said top and having open ends of which one end is in said container near the bottom thereof and the other end is above said container top and formed as an enlarged dispensing receptacle open at its top; a gas conduit common to all containers and having branches leading to the inlets of the respective containers, of which each branch has an opening to the atmosphere outside said containers; and means individual to each of said branches and manipulatable to close said opening thereof.

10. Liquid dispensing apparatus as in claim 9, which further provides a gas compressor with a discharge side in communication with said conduit; means including a normally-open electric switch associated with each of said containers operative on opening and closing of any of said switches to render said compressor inoperative and operative, respectively; and an actuator associated with each container closing the associated switch on manipulation of the associated means.

11. Liquid dispensing apparatus as in claim 9, in which each of said means is yieldingly depressible for manipulation, and is arranged in such proximity to the dispensing receptacle on the associated container as to be depressible by an operator's hand when within dipping reach of said receptacle.

References Cited

UNITED STATES PATENTS

| | | | |
|---|---|---|---|
| 1,223,120 | 4/1917 | Stohn et al. | 222—205 |
| 2,677,480 | 5/1954 | Wiczer | 222—205 X |
| 2,158,102 | 5/1939 | Betzold et al. | 222—205 X |

STANLEY H. TOLLBERG, *Primary Examiner.*